No. 12,150. REISSUED AUG. 25, 1903.

R. P. KUHN.

FORMALDEHYDE LAMP.

APPLICATION FILED APR. 9, 1902.

Witnesses

Fenton S. Belt.

Grace P. Brereton.

Inventor

Richard P. Kuhn

By Sturtevant & Kelley

Attorneys

No. 12,150.

Reissued August 25, 1903.

UNITED STATES PATENT OFFICE.

RICHARD P. KUHN, OF ALEXANDRIA, VIRGINIA, ASSIGNOR, BY DIRECT AND MESNE ASSIGNMENTS, TO THE KUHN FORMALDEHYDE GENERATOR COMPANY, OF ALEXANDRIA, VIRGINIA.

FORMALDEHYDE-LAMP.

SPECIFICATION forming part of Reissued Letters Patent No. 12,150, dated August 25, 1903.

Original No. 652,482, dated June 26, 1900. Application for reissue filed April 9, 1902. Serial No. 102,134.

*To all whom it may concern:*

Be it known that I, RICHARD P. KUHN, residing at Alexandria, in the county of Alexandria and State of Virginia, have invented certain new and useful Improvements in Formaldehyde-Lamps, of which the following is a specification.

This invention is in the nature of an improved means for generating formaldehyde gas, and it seeks to provide a compact and easily-manipulated portable generator or lamp especially adapted for disinfecting such places where contagious diseases occur and which will serve by reason of the poisonous gas produced and disseminated thereby to positively kill all bacilli or germs of contagious diseases of all kinds, the same being also adapted for driving out moth and other household insects.

This invention comprehends among its general features an improved means for muffling or closing off the draft from the generating-chamber, so arranged as to also serve as a means for regulating the discharge of the formaldehyde gas from the appliance.

In its subordinate features my invention consists in certain details of construction and peculiar combination of parts hereinafter described, and particularly set out in the appended claims, reference being had to the accompanying drawings, in which—

Figure 1:
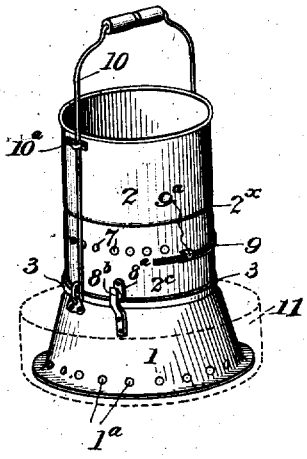
Figure 3:
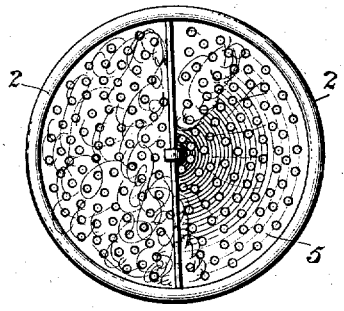
Figure 2:
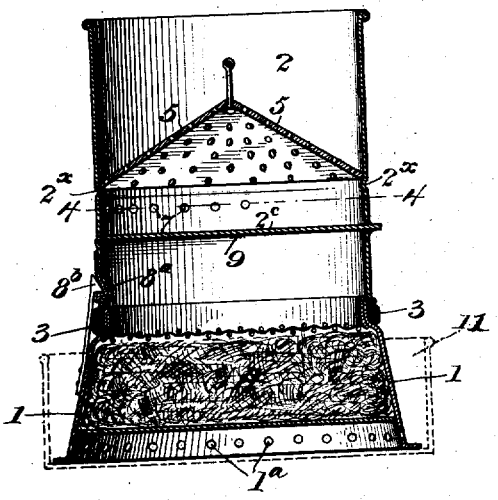
Figure 4:
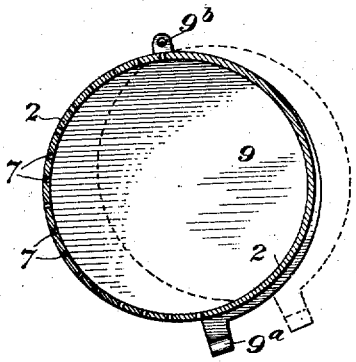

Figure 1 is a perspective view of my improved formaldehyde-lamp. Fig. 2 is a vertical section of the same. Fig. 3 is a top plan view thereof. Fig. 4 is a horizontal section on the line 4 4 of Fig. 2.

Referring to the accompanying drawings, in which like numerals indicate like parts in all the figures, 1 indicates a base open at the bottom, the surrounding edge of the bottom having perforations $1^a$ for the purpose presently explained.

4 indicates the burner or pan, which is supported in the upper portion of the base 1, with its bottom in a plane above the apertures $1^a$. The pan is filled, as shown, with mineral wool or like non-fusible absorbing material. The object in extending the lower portion of the base below the bottom of the burner is to provide means whereby when the said base is set upon the floor the openings $1^a$ will serve to admit air under the burner to prevent charring or otherwise mutilating the floor, chair, or other body upon which it may be supported, it being obvious, however, that in this form of lamp to obtain a maximum gas generation the said apertured base may be conveniently set into a pan of water 11, or that by reason of the circulation of the water under it the pan will become heated and serve to maintain a continuation of the alcoholic evaporation after the diaphragm, presently referred to, has ceased to throw off heat sufficient to further evaporate the alcohol within the burner.

The body portion 2 of the lamp is hinged to the base, and to provide for an air-tight joint when the said body is closed down said portion is held to bear tightly against a thick rubber gasket 3, it being thus tightly held by means of a lock-catch $8^a$, secured to the body 2, and a spring-detent $8^b$, which engages the said lock-catch portion of the body 2, as clearly shown in Fig. 2. At a point about midway its length the body 2 has an inwardly-projecting flange $2^x$, and upon this flange is detachably supported the heat absorbing and deflecting diaphragm 5, which consists of a non-combustible material, such as asbestos board, which is thoroughly saturated with a solution of chlorid of platinum. In the present construction the under side of the diaphragm is especially well platinized, so as to cause it to absorb an intense heat for the purpose described. The diaphragm 5 in my present invention is made conical, with its apex uppermost, it being perforated, as shown. The object of making the diaphragm conical is twofold: first, to provide a heat-collecting surface of much greater area than would be obtainable were it made flat, and, secondly, it also serves for reflecting the heat-rays directly toward the center of the burner-pan.

The body 2 at a point just below the diaphragm 5 has a series of air-inlets 7, that extend half-way around the body, as best illustrated in Fig. 4, and at a point below the apertures is provided a cut-off plate 9, which is pivoted at $9^b$ to the body 2 and held to move through a semicircle slot $2^c$, said plate having a suitable handle extended to the outside of the body, as shown.

So far as described it will be readily seen that to cut off the draft from or to muffle the burner it is only necessary to close in the plate 9 to the position shown in Figs. 2 and 4, and to create a draft the said plate 9 is moved outward, as indicated in dotted lines in Fig. 4. This plate, while serving primarily as a muffler, also acts to regulate the flow of formaldehyde gas from the generating-chamber, which can be readily governed by proper adjustment of the plate 9. This latter function is a very advantageous one, as it enables any one to properly set the lamp in the room to be disinfected without danger to himself, such as is incident in the ordinary application of a formaldehyde disenfectant. Again, by providing a detachable muffler-plate 9 the lamp can be set to discharge a very mild gas flow in the case of extermination of insects, or a heavy or maximum flow for killing disease-germs.

To facilitate the carrying of the lamp, it has a hinged bail 10, as best shown in Fig. 1, which is adapted to be held to its elevated position by a latch $10^a$.

To use my improved lamp, the cylinder or body 2 is swung back, so as to admit of easy access to the burner. After lighting the burner the cylinder 2 is placed over the same and the wool allowed to burn freely until the platinized diaphragm begins to glow. The plate 9 is then shoved over the burner to muffle it, and after the flame has been smothered it is adjusted to an open position to allow for a part of or all of the rays of the disk to concentrate on the saturated wool to evaporate the alcohol and generate the formaldehyde.

Having thus described my invention, what I claim, and desire to secure by Letters Patent, is—

1. In a formaldehyde-lamp, the combination of a water-pan, a burner-pan within the water-pan of such diameter that a water-space is left about the burner-pan between it and the water-pan, means for so supporting the burner-pan as to leave a water-space between the bottom of the burner-pan and the bottom of the water-pan, the water-space below the bottom of the burner-pan being in communication with the water-space about the burner-pan, a generator-body extending above the burner-pan, provided with air-inlets, and a perforated platinized diaphragm supported within the generator-body above the level of the air-inlets; substantially as described.

2. In a formaldehyde-lamp, the combination of a water-pan, a burner-pan within the water-pan, of such diameter that a water-space is left about the burner-pan between it and the water-pan, the burner-pan being provided with a pendent annular perforated extension by which the burner-pan is supported above the bottom of the water-pan so as to leave a water-space in communication with the water-space about the burner-pan, a generator-body extending above the burner-pan, provided with air-inlets, and a perforated platinized diaphragm supported within the generator-body above the level of the air-inlets; substantially as described.

3. A formaldehyde-lamp, comprising a pan adapted to hold an absorbing and non-fusible material, said pan having a pendent annular perforated extension; an oxidizing-chamber projected upward from the pan, said chamber having inlets; a perforated conical platinized diaphragm held within the oxidizing-chamber at a point above the inlets; and means operating between the inlets and the pan for choking the draft in the oxidizing-chamber, for the purposes set forth.

4. A formaldehyde-lamp, comprising a base having a burner-pan adapted to hold an absorbing non-fusible material; the generator-body mounted over the pan, said body having a series of horizontally-disposed apertures 7, extending partially around the same and having a horizontal semicircular slot $2^c$ at a point below the apertures 7; a platinized diaphragm held within the generating-chamber at a point above the apertures 7; and a horizontally-disposed cut-off plate 9, pivoted to the generating-chamber and held to move through the semicircular slot $2^c$, all being arranged substantially as shown and for the purposes described.

In testimony whereof I affix my signature in the presence of two witnesses.

RICHARD P. KUHN.

Witnesses:
H. C. PRICE,
DOUGLASS STUART.